(12) United States Patent
Hiley et al.

(10) Patent No.: US 6,972,885 B2
(45) Date of Patent: Dec. 6, 2005

(54) PRECISION MIRROR DISPLACEMENT ASSEMBLY

(75) Inventors: Dave Hiley, Los Angeles, CA (US); Jason Flathom, Irvine, CA (US); Tal Kiani, Redondo Beach, CA (US); Mario Palombo, Manhattan Beach, CA (US); Jose A. Bernal, Lomita, CA (US)

(73) Assignee: DRS Sensors & Targeting Systems, Inc., Cypress, CA (US)

( * ) Notice: Subject to any disclaimer, the term of this patent is extended or adjusted under 35 U.S.C. 154(b) by 0 days.

(21) Appl. No.: 10/872,980

(22) Filed: Jun. 21, 2004

(65) Prior Publication Data

US 2005/0046979 A1    Mar. 3, 2005

Related U.S. Application Data

(60) Provisional application No. 60/482,144, filed on Jun. 24, 2003.

(51) Int. Cl.[7] ............................................. G02B 26/08
(52) U.S. Cl. ........................ 359/225; 359/872; 248/479
(58) Field of Search ................................ 359/196, 198, 359/199, 223–225, 871, 872, 877; 248/477, 248/479

(56) References Cited

U.S. PATENT DOCUMENTS

| | | | |
|---|---|---|---|
| 3,519,336 A | 7/1970 | Russell | |
| 3,532,408 A | 10/1970 | Dostal | |
| 3,642,344 A | 2/1972 | Corker | |
| 4,732,440 A | 3/1988 | Gadhok | |
| 5,099,110 A | 3/1992 | Shepard et al. | |
| 5,206,492 A | 4/1993 | Shepard et al. | |
| 5,212,582 A | 5/1993 | Nelson | |
| 5,283,682 A * | 2/1994 | Ostaszewski | 359/198 |
| 5,550,669 A * | 8/1996 | Patel | 359/224 |
| 5,557,444 A | 9/1996 | Melville et al. | |
| 5,559,319 A | 9/1996 | Peng | |
| 6,657,759 B2 | 12/2003 | Muller | |
| 2003/0007226 A1 | 1/2003 | Buzzetta | |

* cited by examiner

Primary Examiner—Euncha P. Cherry (74) Attorney, Agent, or Firm—Norris, McLaughlin & Marcus

(57) ABSTRACT

A precision mirror displacement assembly for controlling rotation of a mirror about a rotational axis to obtain a precise mirror orientation includes a mirror having an enhanced backside and a reflective front surface. The enhanced backside has a sufficient thickness to provide that attachment of mirror displacement control components, such as portions of actuator and position sensor assemblies, to the backside during manufacture of the mirror assembly does not cause distortion of the reflective front surface of the mirror. The enhanced backside also is of sufficient thickness to avoid distortion of the front surface based on interaction of the mirror with mechanical stops and actuator components that are attached to a base of a separate housing of the mirror assembly that opposes the backside of the mirror.

6 Claims, 7 Drawing Sheets

PRECISION MIRROR DISPLACEMENT ASSEMBLY

CROSS REFERENCE TO RELATED APPLICATION

This application claims the benefit of U.S. Provisional Application No. 60/482,144 filed Jun. 24, 2003, assigned to the assignee of this application and incorporated by reference herein.

FIELD OF THE INVENTION

The present invention relates generally to directing electromagnetic signals to a precise destination by reflecting the signals, and more particularly, to a precision mirror displacement assembly including a mirror directly coupled to and interacting with mirror displacement control components that precisely control the positioning of the mirror to cause a desired reflection of electromagnetic signals directed to the mirror.

BACKGROUND OF THE INVENTION

Current precision mirror displacement assemblies include various types of mirror displacement control components that provide for high precision rotation of a mirror through a range of angular orientations. See, for example, U.S. Pat. Nos. 5,110,195 and 6,535,319, incorporated by reference herein. The mirror displacement control components, which include actuators, position sensors and mechanical stops, are used in such precision mirror displacement assembly applications as, for example, an optical radiation steering device, a stabilization mirror for an optical sensor, a scanning mirror, a fast steering mirror, an image motion compensation mirror, a dither mirror, an interlace mirror, etc. In many precision mirror displacement assembly applications, the mirror displacement control components must provide for limited angular movement of the mirror about a rotational axis, such as plus or minus five degrees of rotation about an axis relative to a neutral plane, in response to a relatively high bandwidth (100 Hz or greater) drive command signal, and that the mirror can be rotated to a desired orientation with an accuracy of 50 micro-radians or better.

A prior art precision mirror displacement assembly typically includes a pair of relatively robust support mounts that couple a mirror to a separate, moving platform and provide that the mirror can rotate about an axis with little or no friction. As well known in the prior art, mirror support mounts that facilitate rotation of a mirror about an axis include pivot devices having flexure designs such as a crossed-leaf flexure pivot, a post-flexure pivot and a torsion rod or taught wire suspension flexure pivot. See, for example, "Flexure Pivots to Replace Knife Edges and Ball Bearings", Bulletin No. 86, University of Washington, Engineering Experiment Station Series, Published by the University of Washington, Seattle, November, 1935, and W. H. Wittick, "The Theory of Symmetrical Crossed Flexure Pivots", Australian Journal of Science, Res. A, Vol. 1, No. 2, 1948.

In addition, the typical prior art precision mirror displacement assembly includes actuator assemblies that are in the form of, for example, linear voice coil or moving coil actuators. The actuator assemblies are positioned symmetrically about an axis of rotation of the mirror, which the support mounts define, and are coupled to the back surface of the platform that faces away from the mirror. The actuator assemblies are electronically controllable to drive the back surface of the platform in a desired direction which, in turn, causes the mirror to rotate about the axis of rotation. Further, the typical prior art precision mirror displacement assembly usually includes position sensors that also are positioned symmetrically about an axis of rotation of the mirror and interact with the back surface of the platform. Each sensor operates to accurately determine the distance (gap) between itself and the back surface of the platform. The distance information is used to determine the orientation of the mirror relative to a neutral plane. Based on this orientation information, the actuator assembly is controlled, as needed, to move the mirror precisely to a desired angular orientation.

Various types of conventional actuators, sensors, mechanical stops and electronic control modules are available for use as mirror displacement control components in a precision mirror displacement assembly. Precision mirror displacement assembly applications, however, often must satisfy custom design requirements. As a result, the mirror displacement control components must be selected in view of particularized design requirements for a precision mirror displacement assembly. These design requirements include size of the mirror and the entire mirror assembly, ruggedization for operation in a high shock and vibration environment, accuracy over a wide temperature range such as between $-40°$ C. and $70°$ C., and compatibility with readily available mirror displacement control components for minimizing costs and for easing assembly of and adjustment within a precision mirror displacement assembly. For example, it is known that some flexure pivots available for use in a precision mirror displacement assembly are not sufficiently robust to function, and quickly will deteriorate, in a severe shock and vibration environment, such as exists on an aircraft or satellites.

In many precision mirror displacement assemblies, electromagnetic ("EM") radiation shielded interconnecting cables electrically couple the position sensors of the mirror assembly to a separate, external electronic control module. The external control module exchanges information electronically with the sensors, and also the actuator assemblies in the mirror assembly, over the interconnecting cables to provide that the mirror is precisely rotated to a desired orientation. In many mirror assembly applications, the interconnecting cables are subjected to severe EM radiation, and also to high levels of shock or vibration that causes the cables to move slightly despite their having been secured. It has been found that the generation of electrical mirror position data signals by a position sensor is adversely affected when the interconnecting cables that extend between the position sensors and an external control module are moved or subjected to severe EM radiation. Consequently, erroneous mirror position data signals, which do not accurately represent the orientation of the mirror in relation to a neutral plane, are transmitted to the external control module, such that a desired, precise mirror orientation cannot be readily achieved or continuously maintained.

Further, the inclusion of a moving platform in a precision mirror displacement assembly substantially increases the overall size and adds complexity to the manufacture of the mirror assembly. The moving platform, commonly known in the art as a tilt plate, is included in the mirror assembly to protect the highly delicate, flat, optically reflective front surface of a mirror from distortion that would likely result if the mirror were to interact or be coupled with mirror displacement control components such as an actuator, a position sensor and a mechanical stop. Distortion of the reflective surface of the mirror, which can adversely affect mirror performance, would likely occur, for example, when forces are applied to the mirror to directly attach an actuator or sensor component to the mirror during manufacture of the mirror assembly, or when a mechanical stop, which limits the angular range of rotation of the mirror, strikes the mirror to halt rotational motion of the mirror. Consequently, in the prior art, a precision mirror displacement assembly includes a tilt plate whose surface facing away from the backside of the mirror is coupled or interacts with mirror displacement control components. The tilt plate, rather than with the mirror itself, thus absorbs the forces generated based on interaction or coupling with the mirror displacement control components.

Therefore, there exists a need for a precision mirror displacement assembly that satisfies environmental stress requirements, is compact, easy to assemble and install and relatively inexpensive to manufacture using conventional mirror displacement control components and eliminates the need for a separate mounting platform or tilt plate.

SUMMARY OF THE INVENTION

In accordance with the present invention, a precision mirror displacement assembly includes a mirror having a reflective front surface and a backside with an enhanced back surface defining a maximum thickness for the mirror, where the maximum thickness is sufficient to avoid distortion of the reflective front surface that can result from interaction of the mirror with mirror displacement control components, such as a mechanical stop or an actuator, or from manufacture of mirror displacement control components, such as a position sensor target area and a portion of an actuator, on or in the enhanced back surface. The enhanced back surface defines two axially aligned pivot bores. A flexure pivot is secured to the mirror at each of the pivot bores and also to a pivot mount that projects from a base of a housing of the mirror assembly. The flexure pivots, accordingly, define an axis of rotation of the mirror. The enhanced back surface also defines a pair of actuator field bores. The actuator bores are positioned symmetrically about the axis of rotation, and actuator field pieces are secured to the actuator bores. In addition, the enhanced back surface defines a pair of sensor target areas positioned symmetrically about the axis of rotation. Actuator coil pieces and position sensors are secured to the base of the housing and project toward the enhanced back surface opposite to the actuator field pieces and target areas, respectively.

In a preferred embodiment, the housing encloses an integrated sensor electronics module that is electronically coupled to, and performs signal processing associated with the operation of, the position sensors. The sensor electronics module is electromagnetic radiation shielded by the housing and is connected to the position sensors by very short length electromagnetic radiation shielded interconnecting cables. The sensor module generates a mirror position feedback signal from mirror position data signals received from the position sensors, and then supplies the feedback signal to an external controller module. Based on the feedback signal, the external control module supplies an actuator control signal to an actuator assembly in the mirror assembly. The actuator control signal controls the extent to which the actuator assembly will drive the mirror so that the mirror rotates about the axis of rotation and a precise mirror orientation is achieved.

In another preferred embodiment, the enhanced back surface defines a pair of hardpoints positioned symmetrically about the axis of rotation. The hardpoints oppose adjustable mechanical stops that are secured to the base of the housing and project opposite to the hardpoints. The hardpoints interact with the stops to limit the angular range that the mirror can move about the axis of rotation based on driving forces applied to the mirror by the actuators.

In a further preferred embodiment, the enhanced back surface defines threaded trim weight bores for receiving trim weight screws. The trim weight bores are selectively positioned symmetrically about the axis of rotation to provide for adjustment of the center of gravity of the mirror in planes parallel and perpendicular to a neutral plane of the mirror assembly by selectively rotating the trim weight screws within the trim weight bores.

In still a further preferred embodiment, the precision mirror assembly includes an adjustable mounting assembly that provides for rigid coupling of the mirror assembly to a larger optical subassembly, such as an infrared sensor, a laser or any optical system requiring a precision mirror displacement assembly. The adjustable mounting assembly includes an adjustable compression spring assembly. The spring assembly defines a pre-loaded adjustment range within which the rigid coupling is maintained and the position of the subassembly relative to the mirror assembly is adjustable without the need to remove any components of the mounting assembly or to apply substantially high forces to the spring assembly to obtain an adjustment. An adjustable mounting assembly is preferably coupled at three locations on the base of the housing of the mirror assembly to provide that the mirror can be adjusted with relative ease in three degrees of freedom in relation to the optical subassembly.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which.

DETAILED DESCRIPTION OF THE INVENTION

The present invention of a precision mirror displacement assembly incorporates conventional mirror displacement control components, such as actuators, position sensors, position sensor electronics, flex pivot bearings, mechanical stops, etc., into a compact, integrated, easy to assemble and inexpensive to manufacture assembly, where the assembly includes a mirror having an enhanced backside for direct connection and interaction with mirror displacement control components, where the mirror can be rotated with high precision about an axis of rotation to obtain a precise orientation and where the components of the mirror assembly operate satisfactorily in severe shock, vibration and temperature environments.

Figure 1:
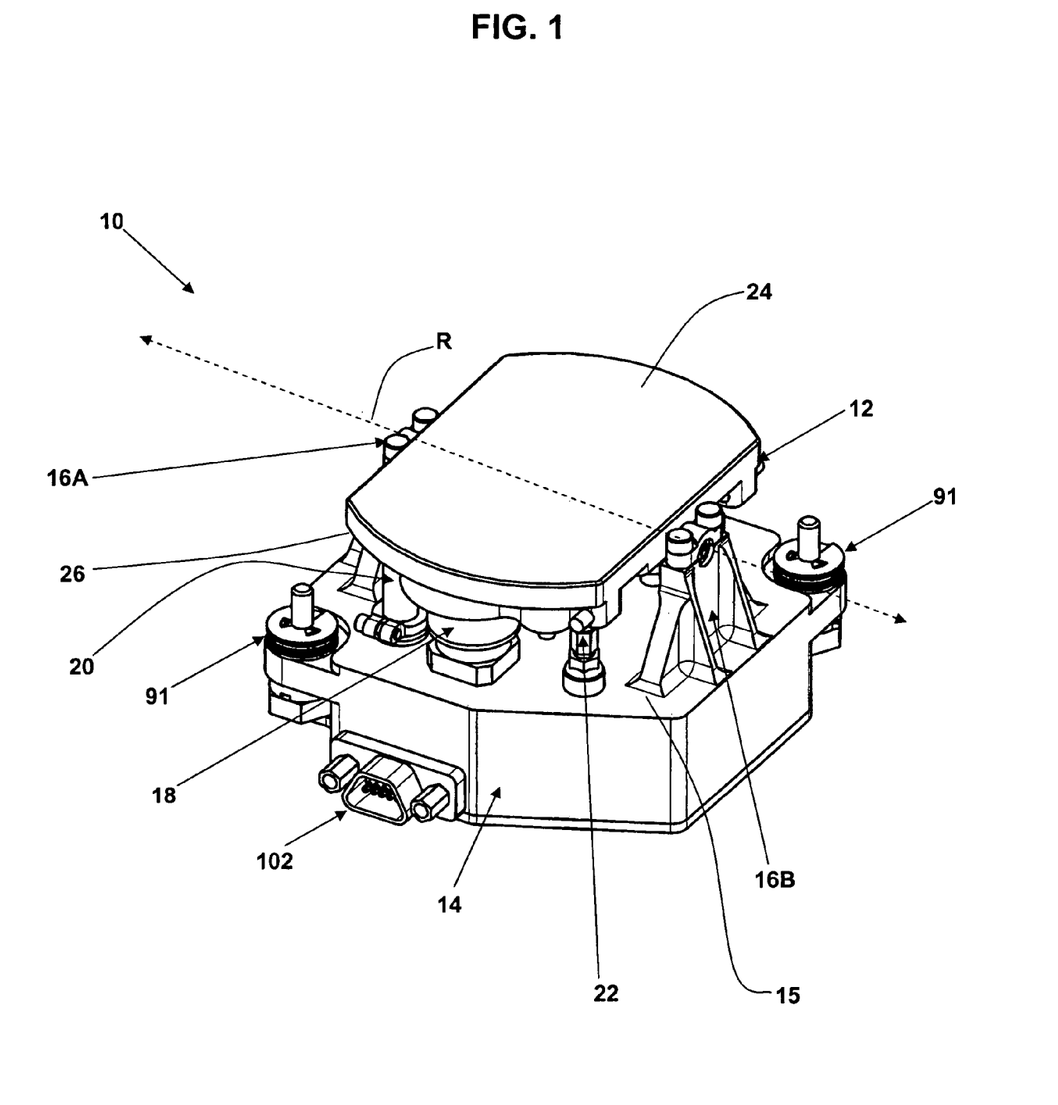
FIG. 1 is a perspective view of a precision mirror displacement assembly in accordance with the present invention.
Figure 2:
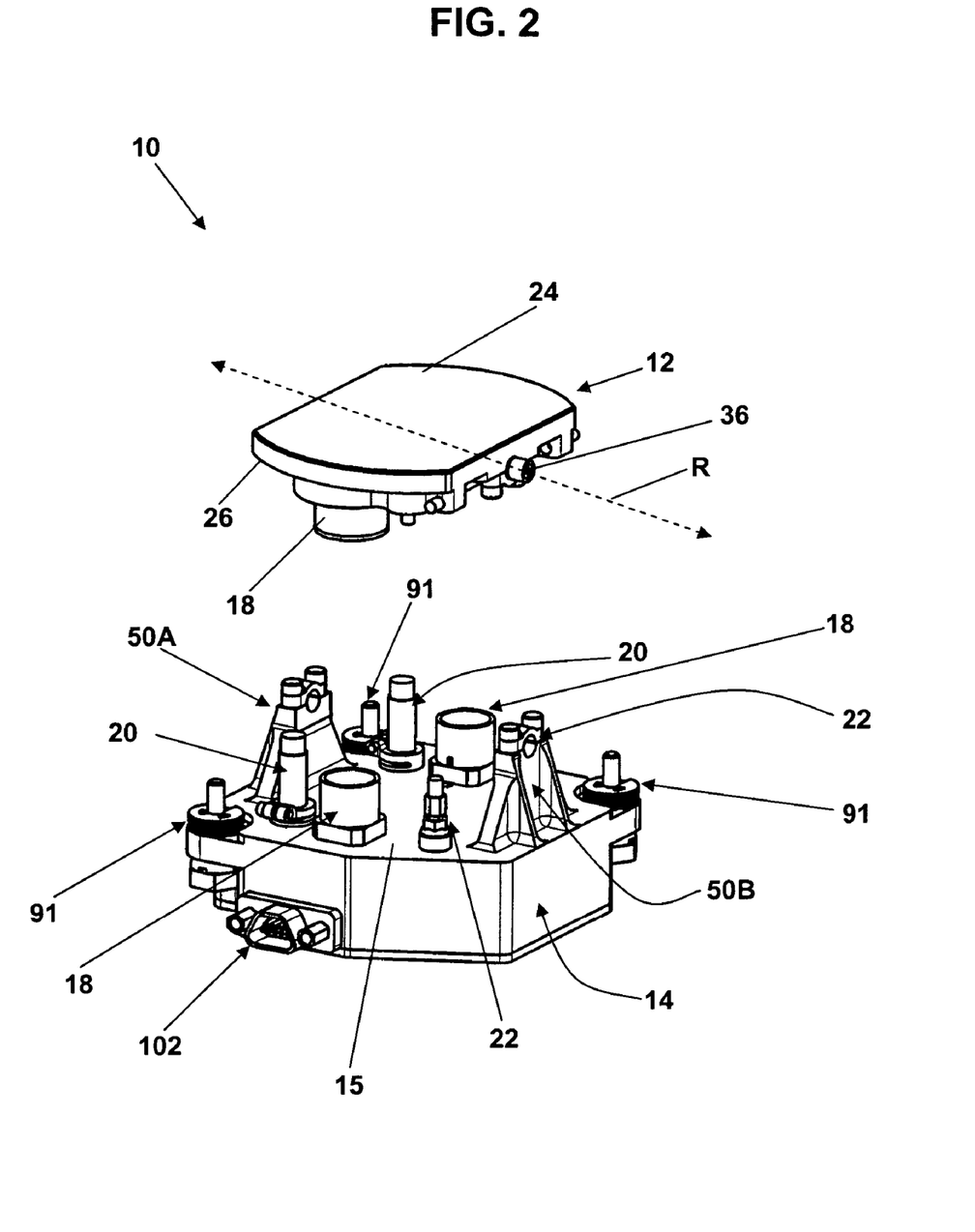
FIG. 2 is a perspective view of the mirror assembly of FIG. 1 with the mirror separated from the housing.

FIG. 1 illustrates a preferred embodiment of a precision mirror displacement assembly 10 in accordance with the present invention. Referring to FIG. 1, the mirror assembly 10 includes a mirror 12 coupled to a base 15 of a housing 14 by pivot mount assemblies 16A, 16B. Referring to FIGS. 1–2, the mirror assembly 10 also includes a pair of actuator assemblies 18, a pair of position sensor assemblies 20 and a pair of adjustable mechanical stop assemblies 22. The assemblies 18, 20 and 22, in combination, operate to precisely control rotation of the mirror 12 about a rotational axis R defined by the pivot assemblies 16, such that a precise angular orientation of the mirror 12 with respect to a null or neutral plane can be obtained. As described in detail below in the text accompanying the description of FIGS. 3 and 5–6, conventional mirror displacement control components associated with the assemblies 18, 20 and 22, such as flexure pivot mounts, position sensors, actuator coil pieces and adjustable mechanical stops, are secured to the base 15 of the housing 14.

The mirror 12 is constructed from aluminum or beryllium plate material, as conventional in the art, and includes a flat front surface 24 and a backside 26. The front surface 24 is diamond turned to achieve an optically flat surface, which minimizes potential optical distortion, and includes a very thin, optically reflective top layer, such as hardened gold. The overall size of the front surface 18 is selected based on the needs of a larger optical subsystem, such as an infrared optical system, in which the mirror assembly 10 will be installed. In a preferred embodiment, the reflective front surface 18 has a substantially oblong or circular shape, truncated by flat sides. In a further preferred embodiment, the front surface has a rectangular configuration with rounded ends having dimensions of about 0.73 inches by about 1.25 inches or about 1.25 inches by about 2.10 inches, or a substantially circular configuration whose diameter is about 4 inches or less.

In accordance with the present invention, the backside 26 of the mirror 12 includes enhancements on selected portions that define predetermined thicknesses for the mirror 12. The enhancements are defined by selectively machining the aluminum or beryllium plate material that forms the mirror 12. The predetermined thicknesses are equal to or greater than the minimum thickness required to ensure a sufficient overall mirror stiffness, and also localized stiffnesses, that would avoid distortion of the flat front, optically reflective surface 24 based on (i) manufacture of mirror displacement control components in or onto the backside 26, or (ii) interaction between mirror displacement control components and the backside 26 when the mirror assembly 10 is operated to rotate the mirror 12 about the axis R to obtain a precise mirror orientation. The enhancements are positioned on the backside of the mirror to ensure that a sufficient mirror thickness exists between a portion on the backside 26 expected to experience a localized strain and the opposing portion of the reflective front surface 24.

Figure 4:
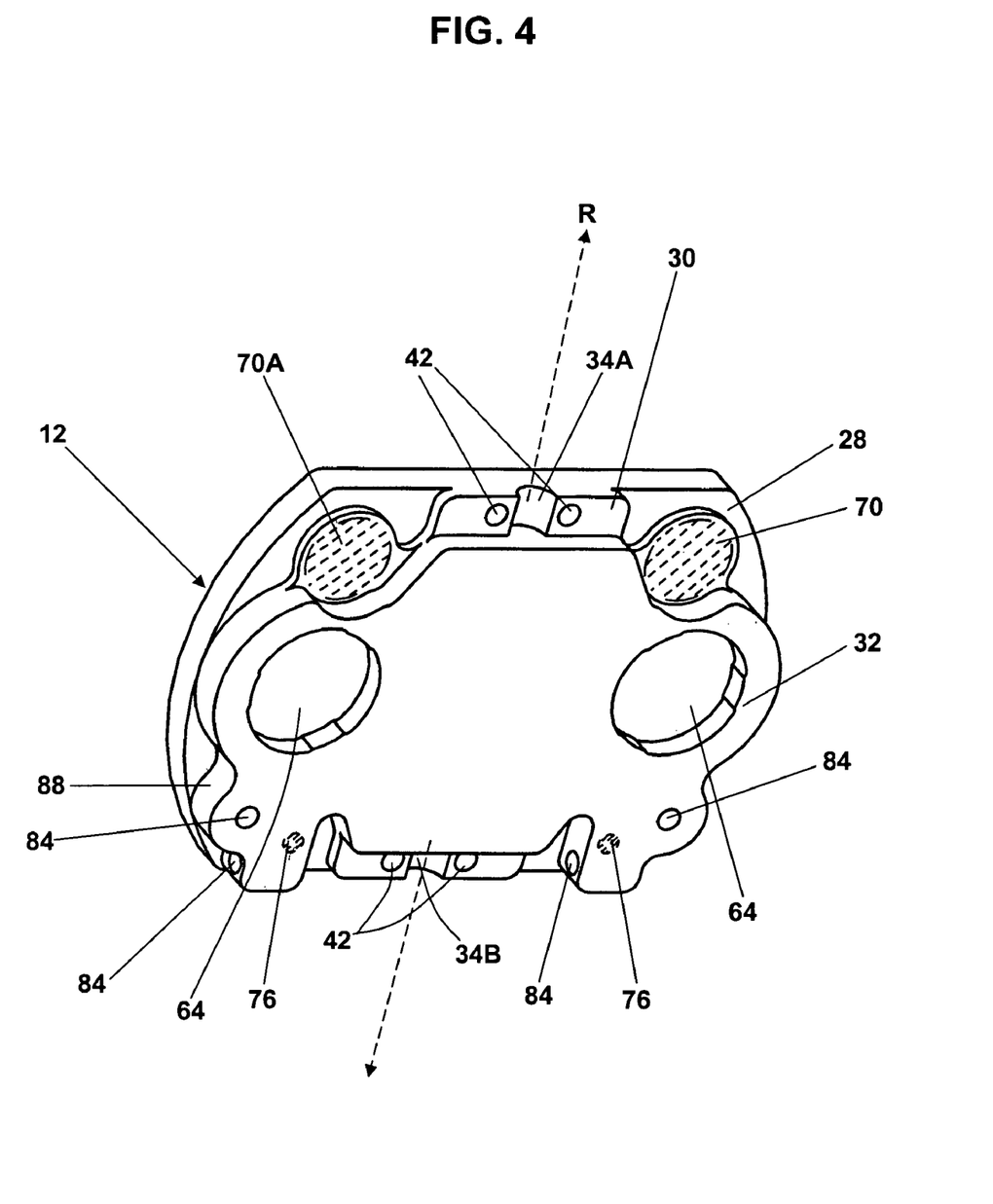
FIG. 4 is a perspective view of the backside of the mirror of the mirror assembly of FIG. 1.
Figure 5:
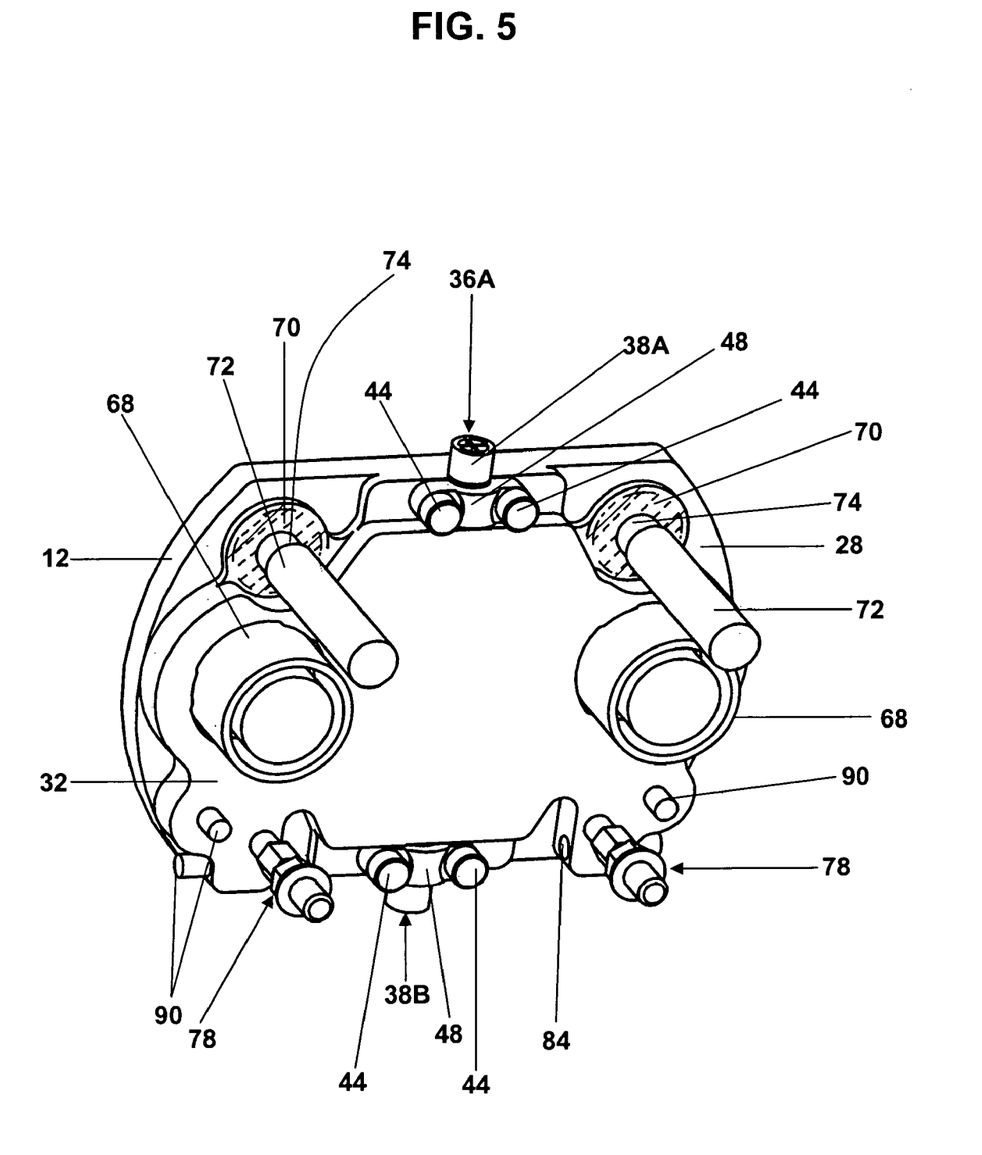
FIG. 5 is a perspective view of the backside of the mirror and selected mirror displacement control components of the mirror assembly of FIG. 1.
Figure 6:
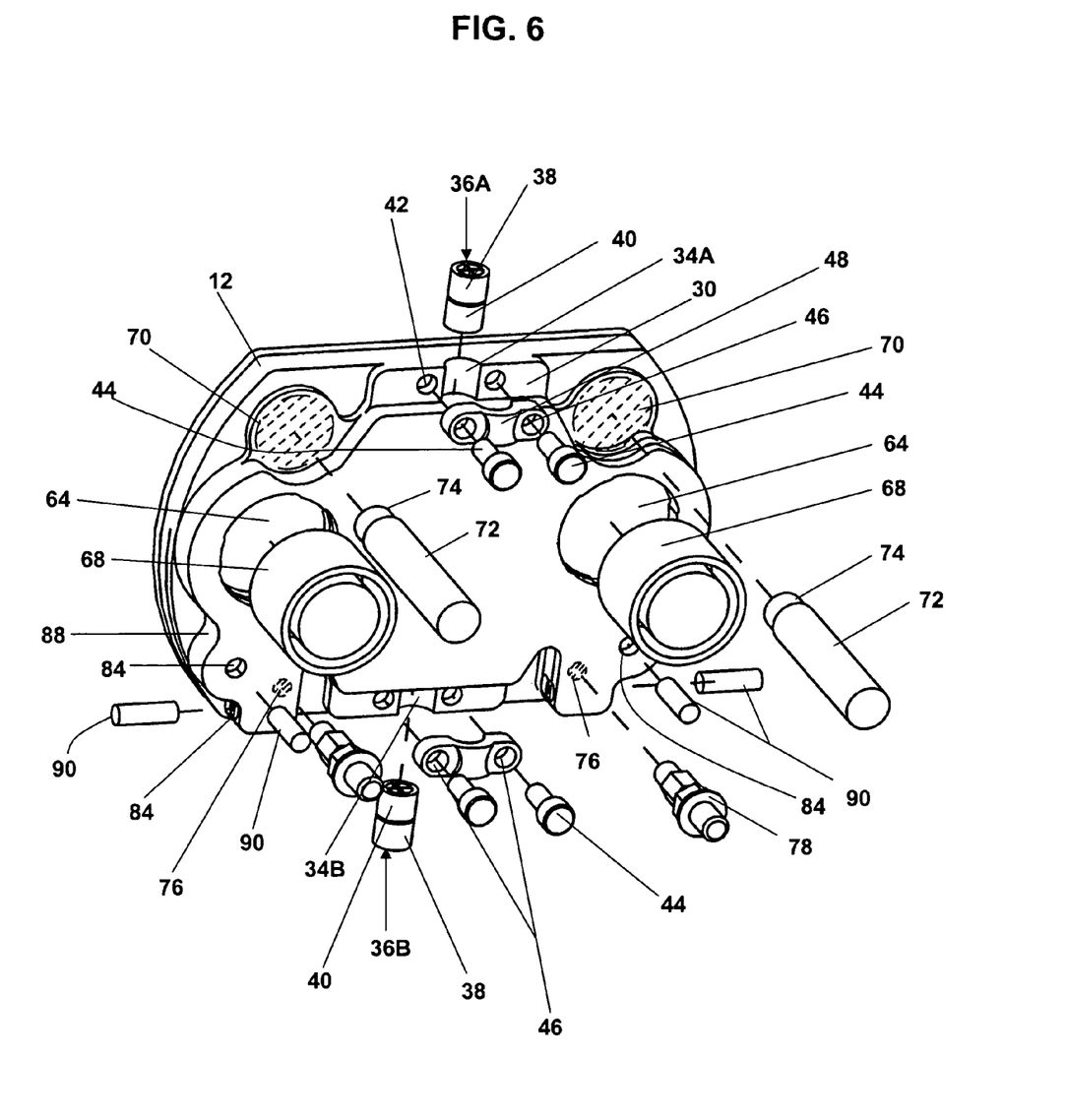
FIG. 6 is an exploded view of the backside of the mirror and the selected mirror displacement control components of FIG. 5.

Referring to FIGS. 4–6, which illustrate a preferred embodiment of the mirror 12 of the assembly 10, the backside 26 includes enhancements that correspond to substantially flat back surfaces 28, 30 and 32. The back surfaces 28, 30 and 32 define minimum, intermediate and maximum thicknesses, respectively, for the mirror 12. The surface enhancements are selectively disposed on the backside 26 of the mirror 12 to provide that at least a part of each of the assemblies 18, 20 and 22 can be secured directly to, incorporated within or interact directly with the mirror 12 without causing distortion to the reflective surface 24.

The enhanced portions of the backside 26 act as a high stiffness insulating layer that eliminates the need for a separate tilt plate between the mirror and mirror displacement control components in a precision mirror displacement assembly, as has been conventional in the prior art. In the prior art, the tilt plate is coupled to the mirror backside and parts of mirror displacement control components associated with, for example, actuators, position sensors and mechanical stops, are attached to the tilt plate, rather than the mirror itself, to avoid any direct contact between such components and the mirror during manufacture or operation of the mirror assembly. The tilt plate, thus, functions to insulate the mirror 12 from potential sources of strain that may cause distortion to the flat, optically reflective front surface 24. Advantageously, the present invention of including enhancements on the backside 26 of the mirror 12 eliminates the need for a tilt plate in a mirror assembly, which simplifies overall manufacture of a mirror assembly because there are fewer parts and internal interfaces.

Referring again to the preferred embodiment of the mirror 12 shown in FIGS. 4–6, the back surface 32 has a larger surface area than each of the back surfaces 28 and 32. In a preferred embodiment, the mirror 12 has a maximum thickness of about 0.314 inches, an intermediate thickness of about 0.220 inches and a minimum thickness of about 0.139 inches, and most preferably the maximum thickness and intermediate thickness exceed the minimum thickness by about 0.200 inches and about 0.100 inches, respectively.

The back surface 30 defines longitudinally extending, axially aligned pivot bores 34A and 34B. Each of the bores 34 has a depth less than the difference between the intermediate thickness and the minimum thickness, and is shaped to receive a conventional, cylindrical flexure pivot 36. The axis of rotation R for the mirror 12 extends through the centers of the flexure pivots 36 that are received in the bores 34A, 34B. The flexure pivots 36, as well known in the art, are cylindrical, limited rotational bearings having relatively high radial and axial stiffness and low torsional stiffness. The flexure pivots 36 include outer and inner stainless steel sleeves 38 and 40 held in position by two leaf springs (not shown) in two orthogonal planes. The two sleeves 38 and 40 do not contact each other and each can rotate independently of the other.

In addition, the back surface 30 defines a threaded bore 42 on each side of the pivot bores 34A, 34B. Screws 44 pass through holes 46 of pivot clamps 48 into the bores 42 to secure the sleeves 40 of the flexure pivots 36 in the bores 34. During the mirror assembly manufacturing step of installing the screws 44, the localized area around each of the threaded bores 42 in the backside surface 30 will experience some localized strain. Accordingly, the thickness of the back surface 30 is selected to account for the depth of the bore 42 and provide a sufficient mirror thickness between this localized strain area and the front surface 24 to avoid distortion of the optically reflective layer that is part of the front surface 24.

Figure 3:
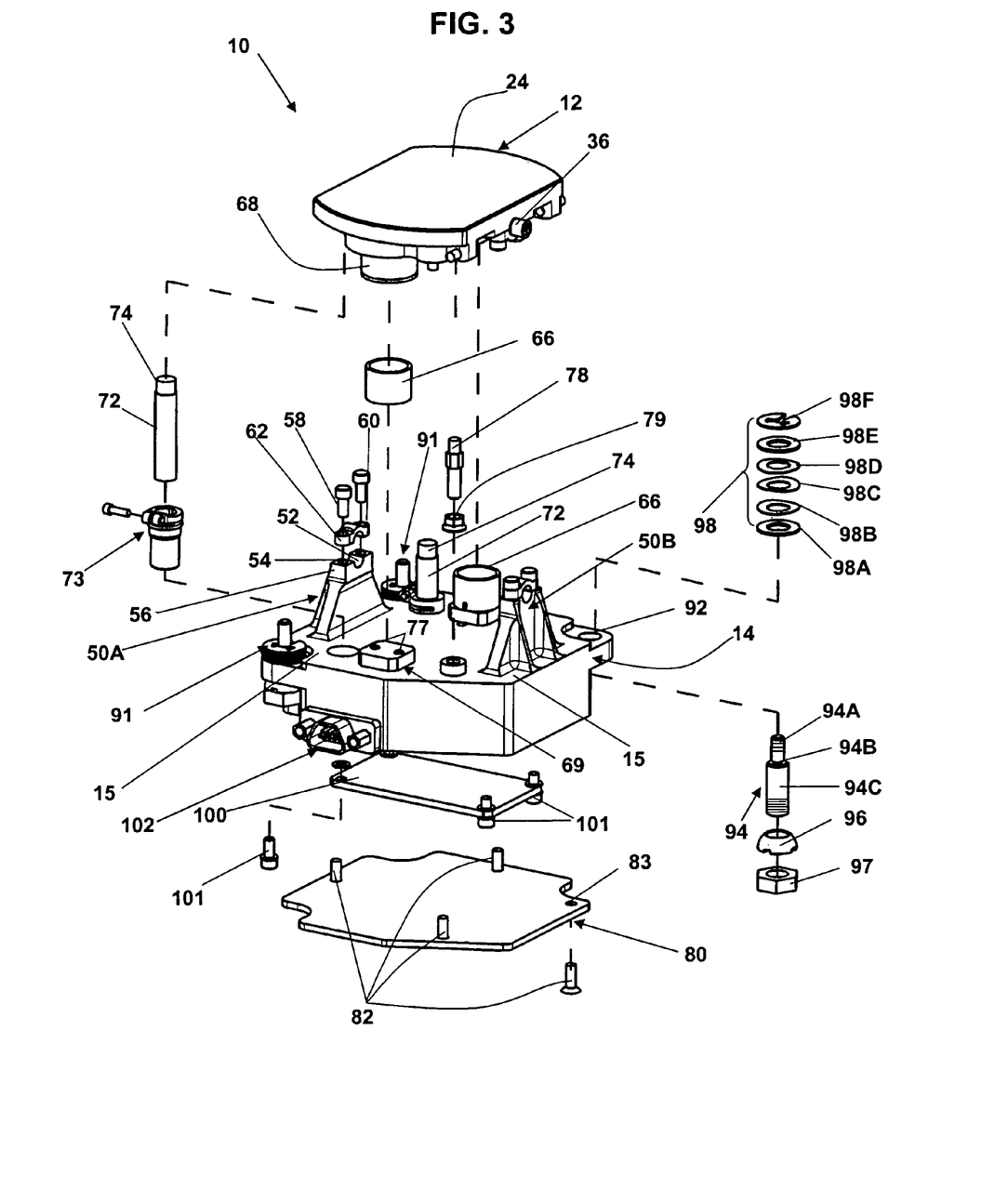
FIG. 3 is a perspective view of the mirror assembly of FIG. 1 in exploded form.

Referring to FIG. 3, flexure pivot mounts 50A, 50B are secured to the base 15 of the housing 14 and include flexure pivot recesses 52 and associated threaded bores 54 at a top end 56. The sleeves 38 of the flexure pivots 36 are received in the recesses 52 and screws 58 pass through holes 60 of pivot clamps 62 to secure the sleeves 38 of the flexure pivots 36 to the pivot mounts 50. The two flexure pivots 36, when secured to each of the pivot mounts 50A, 50B and to the pivot bores 34A, 34B in the backside 26 of the mirror 12, permit the mirror 12 to rotate about the axis R and otherwise restrict movement of the mirror 12 for all other degrees of freedom. The combination of the pivot mounts 50, the clamps 48 and 62, the screws 44 and 58 and the flexure pivots 36, configured as described above, constitute the pivot mount assemblies 16 of the mirror assembly 10.

In an alternative preferred embodiment, the flexure pivots 36 are replaced by conventional, crossed leaf flexure assemblies that include individual flexure blades arranged in a crossed leaf configuration and secured to the pivot mount 50 with screws and clamps or other conventional fastener means.

Referring again to FIGS. 4–6, the back surface 32 defines a pair of bores 64 positioned symmetrically about the axis of rotation R of the mirror 12. Each actuator assembly 18 is preferably a linear voice coil actuator, such as sold by BEI Kimco Magnetics Division, including a coil piece 66 and a corresponding field piece 68 that operate in combination to produce torque for moving the mirror 12 about the axis R. The bores 64 have a depth that is not greater than the difference between the maximum thickness and the minimum thickness of the mirror 12. The depth of the bores 64 is selected such that, in manufacture of the mirror assembly 10, conventional techniques that do not require the use of special tooling can be utilized to mount the field pieces 68 accurately and securely to the bores 64 without causing distortion to the front mirror surface 24. The corresponding coil pieces 66 are mounted to a raised area 69 on the base 15. Threaded screws (not shown) extend from below the base 15, through holes 77 in the raised area 69 and into corresponding threaded holes (not shown) on the bottom side of the coil piece 66, as is conventional in the art. The coils 66 of the pair of actuator assemblies 18 are wired in a conventional, push-pull configuration for generating a driving torque that causes the mirror 12 to rotate in a desired direction about the axis R.

As well known and conventional in the art, application of a voltage to the coil 66 causes electrical current to flow through the coil 66, and the electrical current interacts with the magnetic field within the corresponding field piece 68 to produce a driving force between the mirror 12 and the base 15. The driving force acts on the mirror 12 to cause the mirror 12 to rotate about the axis R. The driving force generated by the actuator assemblies 18 is controllable to produce a precise limited, angular motion of the mirror 12 about the axis R.

Referring once again to FIGS. 4–6, the back surface 30 further includes a pair of target areas 70 positioned symmetrically about the axis of rotation R. The sensor assembly 20 includes a non-contact displacement sensor head 72 that operates on the eddy current principle in relation to a target area 70. Referring to FIGS. 2–3, the sensor heads 72 are mounted to the base 15 using a conventional clamp or retention device 73, and positioned on the base 15 such that active ends 74 are adjacent and opposite to the target areas 70 on the surface 30 of the mirror 12. In a preferred embodiment, the retention device 73 is in the form of a conventional split clamp fastener configuration including a screw which, when in a loosened position, allows the sensor head 72 to be adjusted and, when in a tightened position, securely holds the sensor head 72 without distorting the sensor head 72.

In a preferred embodiment, the target areas 70 constitute flat and uniform areas. The areas do not include surface features or metal coatings that would disturb interaction between the electromagnetic field that the sensor head 72 would produce and the resulting eddy currents that would be generated on the aluminum or beryllium material that forms the back surface 30 of the mirror 12. In addition, the target areas 70 preferably are circular in shape, and include a surface coating containing sufficient chromate material to protect against corrosion while avoiding degradation of the capability of a target area 70 to electromagnetically interact with an opposing sensor head 72.

In operation, a high frequency alternating current flows through a coil cast in each sensor head 72 to produce an electromagnetic field at the active ends 74. The field, in turn, induces eddy currents in the target area 70 that alter the AC impedance of the coils of the head 72. The amount of eddy current induced is proportional to the distance or gap between the end 74 and the opposing target area 70. The change in impedance at the head 72, in turn, produces a linear electrical signal that also is proportional to the gap between the target area 70 and the end 74 of the sensor head 72. As well known in the art, the linear electrical signals constitute mirror position data signals that represent the gaps between the target areas and the sensor head ends on both sides of the axis R. The mirror position signals can be processed at a conventional, external electronic control module to obtain a precise measure of the angular orientation of the mirror 12 relative to a null or neutral plane. Based on the determination of the angular orientation of the mirror 12, the external control module suitably can cause the actuator assembly 18 to rotate the mirror 12 about the axis R to obtain a desired, precision mirror orientation. Advantageously, integration of the target areas 70 into the mirror 12 eliminates the need for separately attached target pieces, as existed in some prior art precision mirror displacement assemblies, thereby reducing the number of parts needed for manufacture of a precision mirror displacement assembly.

Figure 7:
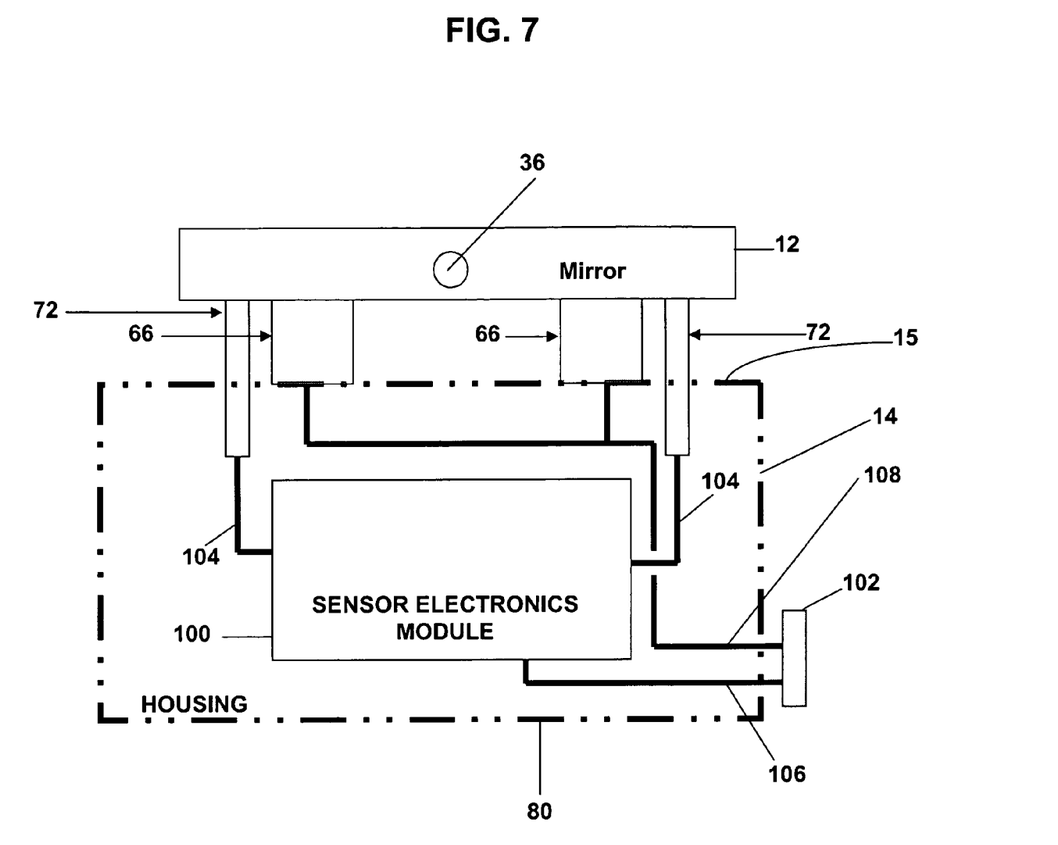
FIG. 7 is a schematic diagram of interconnections among selected mirror displacement control components of the mirror assembly of FIG. 1.

In a preferred embodiment, the electronic components and circuitry conventionally used in connection with the operation of the sensors assemblies 20 are included in a sensor electronics module 100 that is contained completely within an enclosure formed by the housing 14 and a cover 80. FIG. 7 schematically illustrates interconnections between the sensor electronics module 100 and the position sensors 72 of the mirror assembly 10. Referring to FIG. 7, the module 100 is coupled to the sensors 72 and to a conventional interface connector 102 via interconnecting cables 104 and 106, respectively, that also are contained completely within the housing 14. In addition, interconnecting cables 108 within the housing 14 couple the actuator coil pieces 66 to the interface connector 102. Referring to FIG. 3, screws 101 secure the module 100 to the underside of the base 15. In addition, screws 82 attach the cover 80 to the housing 14 to form a complete enclosure around the module 100 and the cables 104, 106 and 108.

In accordance with the present invention, the module 100 includes suitable hardware and software for controlling data signal processing operations conventionally associated with the sensor assemblies 20. For example, the module 100 includes a differential impedance amplifier for receiving electrical mirror position data signals supplied by the sensors 72 over the cables 104, and also other conventional sensor signal conditioning electronics. Based on the mirror position data signals, the module 100, using conventional feedback signal conditioning techniques, generates an analog mirror position feedback voltage signal that is proportional to the rotation angle of the mirror 12. The module 100 transmits the feedback signal over the cable 106 to the interface connector 102. An external control module (not shown) coupled to the connector 102 processes the feedback signal, and then transmits an actuator control signal back to the interface connector 102. The control signal is then routed to the coil pieces 66 of the actuator assemblies 18 via the interconnecting cable 108. The actuator signal, in turn, causes the actuator assemblies 18 to move the mirror 12 to a desired, precise mirror orientation.

The integration of the sensor module 100 into the housing 14 provides several advantages. The housing 14 and the cover 80, each of which is made from aluminum material, together form an enclosure that protects the module 100 and the cables 104, 106, 108 from the natural environment as well as electromagnetic radiation interference. The mating surfaces of the housing 14 and the cover 80 include a chromate coating, which protects against corrosion while also providing for the electrical conductivity between the housing 14 and cover 80 that is required to form an electrically continuous electromagnetic radiation shielded enclosure. In addition, the interconnecting cables 104 can be relatively short in length, such as about one to two inches. In a typical prior art precision mirror displacement assembly implementation, an interconnecting cable having a length of about six to eight inches is required to couple the position sensor to an external control module. A shorter length cable 104 is possible in accordance with the present invention, because the module 100 that performs mirror position data signal processing is in close proximity to the sensors 72. The shorter length interconnecting cable decreases the chance that the cable will move in the presence of high shock or vibration. Motion in the cable that is connected to a position sensor has been identified as a source of distortions in the mirror position data signals generated and transmitted by the position sensor. Such distortions can cause inaccuracies in a sensor feedback signal that is generated at the external control module. Thus, the incorporation of the sensor module 100 into the housing 14 minimizes the inaccuracies in the mirror position data signals that motion of the interconnecting cable and EMI can cause, thereby improving mirror assembly performance.

Further, the back surface 32 includes a pair of integrated hardpoints 76 positioned symmetrically about the axis of rotation R. The hardpoints 76 constitute the contact or interaction points for adjustable mechanical stops 78 of the stop assemblies 22. The stops 78 are secured by conventional fasteners 79 to the base 15 of the housing 14 opposite to the hardpoints 70. The position of the stop 78 is adjustable, as needed, to limit the angular motion of the mirror 12 and ensure that the mirror 12 does not rotate so as to impinge a sensor head 72. The thickness of the mirror 12 at the hardpoints 70 provides that the force applied to the mirror when the stop 78 contacts the hardpoint 70 does not cause distortion to the reflective surface 24. Advantageously, the integration of the hardpoints 70 into the backside of the mirror 12 eliminates the need to install separate bumpers or pads between the stops 78 and the mirror 12, thereby simplifying manufacture of the assembly 10.

In a further preferred embodiment, referring to FIGS. 4–6, the enhancement of the backside 26 of the mirror 12 existing between the back surface 32 and the back surface 28 includes two pairs of threaded trim weight bores 84 positioned symmetrically about the rotational axis R. The two pairs of bores 84 are selectively positioned to provide that the center of gravity of the mirror 12 can be balanced in planes parallel and perpendicular to a neutral plane of the mirror assembly 10. The ability to balance the center of gravity of the mirror 12 permits that the orientation of the mirror 12 can be adjusted to compensate for motion disturbances introduced by the base 15 of the housing 14, or errors resulting from mirror assembly manufacturing variations and design errors.

For example, following manufacture of the assembly 12, adjustable trim weights 90 in the form of set screws are selectively screwed into one or more of the threaded bores 84 to precisely balance the mirror assembly 12. As the set screws are rotated into the bores 84, the linear motion of the mass of the screw 90 causes the center of gravity of the mirror assembly 12 to shift slightly, thereby facilitating precision balancing of the mirror assembly 12.

In the preferred illustrated embodiment, one pair of the bores 84 is located in the back surface 32 and the second pair of the bores 84 is located in a lateral edge surface 88 of the mirror 12 that extends between the back surface 32 and the back surface 28. The mirror assembly 10 is preferably constructed to locate the center of gravity of the combination of the mirror 12 and all of the components attached to the backside 26 of the mirror on the rotational axis R. It is preferred to have the center of gravity on the axis R because the state of balance that is achieved avoids interaction between angular motion of the mirror 12 and linear vibrations that environmental stresses can generate in the base 15. Thus, by locating the center of gravity of the mirror 12 on the rotational axis R, linear vibrations in the base 15 will not disturb the desired angular orientation of the mirror 12. As some imbalance in the mirror 12 is expected from design errors and manufacturing variability, the trim weights 90 provide the capability that the center of gravity of the mirror 12 can be slightly shifted to compensate for these small variations.

Referring to FIG. 3, in a further preferred embodiment the mirror assembly 10 includes an adjustable mounting assembly 91 for coupling at each of three mounting holes 92 in the base 15 of the housing 14. The mounting assemblies 91 provide that the mirror assembly 10 can be adjustably and rigidly coupled to a larger optical subassembly, such as an infrared sensor, a laser or any optical system requiring a precision mirror displacement assembly. The adjustable mounting assembly 91 includes an adjustable compression spring assembly 98 that defines a pre-loaded adjustment range. Within the adjustment range, rigid coupling between the subassembly and the mirror assembly 10 can be maintained and the position of the subassembly relative to the mirror assembly 10 can be adjusted by applying only a few pounds of force, such as about five to ten pounds, to an adjustment mechanism of the mounting assembly 91. Further, the adjustments within the pre-loaded range can be achieved without the need to remove any components of the mounting assembly, as is required for typical prior art mirror assembly adjustable mounting assembly implementations formed from spacers and the like.

In the preferred embodiment of an adjustable mounting assembly 91 illustrated in FIG. 3, the assembly 91 includes a shoulder screw 94 having a threaded small end 94A. The small end 94A is screwed into a threaded hole of a larger optical subassembly (not shown) to which the mirror assembly 10 is to be mounted. When shoulder 94B of the screw 94 contacts the mounting surface of the subassembly, the shoulder screw 94 is in the tightened positioned and the screw 94 becomes a post from which the mirror assembly 10 can be suspended. The shoulder screw 94 also includes a threaded large end 94C. The mounting hole 92 in the housing 14 defines a sufficiently large opening so that the large end 94C of the shoulder screw 94 can pass through the hole 92 with some clearance and be secured to the housing 14 using an adjustment mechanism, such as a spherical nut 96 and a jam nut 97.

Before the large end 94C is passed through the hole 91 of the housing 14, an adjustable compression spring assembly 98 is coupled to the large end 94C. The spring assembly 98 includes, in sequence, a flat washer 98A, a spring washer 98B, a spring washer 98C, a spring washer 98D, a flat washer 98E and a washer retainer 98F, where the flat washer 98A is disposed closest to the housing 14. When the mirror assembly 10 is mounted to the subassembly, the spring assembly 98 occupies the space between the housing 14 and the subassembly. The three spring washers 98B, 98C and 98D provide a pre-loaded adjustment range over which a compressive force is maintained between the subassembly and the mirror assembly 12, such that the former is maintained rigidly coupled to the latter. Advantageously, within the adjustment range, the position of the mirror assembly 12 relative to the subassembly can be adjusted by applying a relatively low force, such as five to ten pounds of torque, to the nut 96. As the nut 96 is rotated and advanced along the length of the shoulder screw 94 within the pre-loaded adjustment range, the mirror assembly 12 moves with the nut 96 but remains rigidly coupled to the subassembly. After the optical alignment is completed by rotating the spherical nut 96 to a desired position along the screw 94C within the adjustment range, the jam nut 97 is tightened against the spherical nut 96 to prevent further rotation and to lock the mounting assembly 91 in place. After the jam nut 97 is tightened, all threaded connections in the assembly 98 are secure and the compressive loads in the spring washers 98C, 98D and 98E maintain the mirror assembly 10 rigidly coupled to the subassembly. In a preferred embodiment, any or all threads in the assemblies 91 are further secured with chemical thread-locking compound.

In the preferred illustrated embodiment, a mounting assembly 91 is coupled at three selected positions on the housing 14 of the mirror assembly 10 to provide that the mirror 12 can be optically adjusted in three degrees of freedom, namely, tip, tilt and piston. Assuming that the surface of the mirror 12 is a first plane and that second and third planes are arranged relative to the first plane such that all three planes are an orthogonal set, tip and tilt represent mirror rotations in the second and third planes. Piston movement corresponds to translation of the mirror in a direction perpendicular to the surface of the mirror. The assemblies 91, thus, provide that the position of the mirror 12 can be easily adjusted relative to the optical subassembly to which the mirror assembly 10 is rigidly mounted without the need to apply a high level of force to the mounting assembly to obtain the desired adjustment. In the prior art, the need to apply relatively high forces to adjust the position of a mounting assembly, such as a coaxial "screw within a screw" mounting assembly, sometimes caused other components in the mirror assembly to deform. These deformations impacted optical alignment of the mirror 12, thereby necessitating iterative and time consuming adjustment of the mounting assembly.

In a preferred embodiment of the mirror assembly 10, the overall width is between about 1.97 and 2.37 inches, the overall length is between about 1.97 and 2.33 inches and the overall height is between about 1.50 and 1.59 inches.

Although preferred embodiments of the present invention have been described and illustrated, it will be apparent to those skilled in the art that various modifications may be made without departing from the principles of the invention.

What is claimed is:

1. A precision mirror displacement assembly comprising:
a mirror including a reflective front surface and a backside, wherein the backside includes a first back surface defining a first thickness for the mirror and a second back surface defining a maximum second thickness for the mirror, wherein the second thickness exceeds the first thickness by at least a predetermined amount;
wherein the second back surface defines first and second longitudinally extending pivot bores for receiving first and second flexure pivots, respectively, wherein the first and second pivot bores extend along the same longitudinal axis and have a maximum depth that is less than the difference between the second thickness and the first thickness;
wherein the second back surface further defines at least one of:
first and second bores for receiving respective first and second voice coil pieces, wherein the first and second bores are selectively positioned on opposite sides of the pivot bore axis and have a maximum depth that is less than the difference between the second thickness and first thickness;
first and second target areas selectively positioned on opposite sides of the pivot bore axis; and
first and second hardpoints selectively positioned on opposite sides of the pivot bore axis.

2. The mirror assembly of claim 1 further comprising:
a housing enclosing a sensor electronics module, the housing comprising a base having a top surface opposing a portion of the backside of the mirror;
first and second flexure pivots and first and second flexure pivot mounts for receiving the first and second flexure pivots, respectively, wherein the first and second pivot mounts project from the base toward respective first and second points adjacent to the first and second pivot bores and not opposite to the backside of the mirror, wherein the first and second flexure pivots are secured into the first and second pivot bores and to the first and second pivot mounts and define an axis of rotation for the mirror; and
at least one of:
first and second voice coil pieces mounted to the base opposing the first and second voice coil bores, respectively, wherein first and second coil pieces are respectively coupled to the first and second voice coil bores, wherein the first voice coil piece and first field piece pair and the second voice coil piece and second field piece pair form an actuator assembly for driving the backside of the mirror to cause the mirror to rotate about the rotation axis; and
first and second sensors electronically coupled to the sensor module and mounted to the base opposing the first and second target areas, respectively, wherein each of the first and second sensors has an active head on an end opposing the backside of the mirror, wherein the sensor module and the active heads exchange electrical signals representative of the distance between the active head and the corresponding target area.

3. The mirror assembly of claim 2 further comprising:
an adjustable mounting means coupled to the base at a location not opposing the mirror and operable for adjustably coupling the housing to an optical subassembly, wherein the adjustable mounting means includes an adjustable compression spring assembly that defines a pre-loaded adjustable compression range, and wherein, within the compression range, the position of the mirror assembly is adjustable horizontally and vertically in relation to the optical subassembly while the mirror assembly is maintained rigidly coupled to the subassembly.

4. The mirror assembly of claim 2 further comprising:
first and second adjustable stops for limiting rotation of the mirror about the axis, wherein the first and second stops are coupled to the base opposite to the first and second hardpoints, respectively.

5. The mirror assembly of claim 2, wherein the second back surface of the mirror defines threaded trim weight bores positioned for balancing the mirror in relation to the axis of rotation.

6. The mirror assembly of claim 5, wherein the trim weight bores are located within the second back surface at selected positions such that, when trim weight screws are threaded into selected ones of the trim weight bores, the center of gravity of the mirror is adjusted with respect to at least one of a plane parallel and a plane perpendicular to the front surface of the mirror.

* * * * *

UNITED STATES PATENT AND TRADEMARK OFFICE
CERTIFICATE OF CORRECTION

PATENT NO. : 6,972,885 B2
DATED : December 6, 2005
INVENTOR(S) : Hiley et al.

It is certified that error appears in the above-identified patent and that said Letters Patent is hereby corrected as shown below:

Column 10,
Line 37, "91for" should read -- 91 for --.

Signed and Sealed this

Eighteenth Day of April, 2006

JON W. DUDAS
*Director of the United States Patent and Trademark Office*